United States Patent [19]

Williames

[11] Patent Number: 4,718,363

[45] Date of Patent: Jan. 12, 1988

[54] MULTI-PURPOSE SEEDING MACHINE

[75] Inventor: Geoffrey A. Williames, Warragul, Australia

[73] Assignee: Williames Hi-Tech Int'l Pty Ltd., Warragul, Australia

[21] Appl. No.: 833,340

[22] Filed: Feb. 26, 1986

[30] Foreign Application Priority Data

Feb. 28, 1985 [AU] Australia .................. PG9542

[51] Int. Cl.⁴ .............................. A01C 7/04
[52] U.S. Cl. ............................ 111/1; 111/71; 111/91; 221/211
[58] Field of Search ............ 111/1, 34, 77, 6, 7, 111/89, 91; 47/1 A; 221/211, 278

[56] References Cited

U.S. PATENT DOCUMENTS

| | | | |
|---|---|---|---|
| 2,737,314 | 3/1956 | Anderson | 111/34 X |
| 3,322,080 | 5/1967 | Gatzke et al. | 111/1 |
| 4,181,241 | 1/1980 | Currah | 111/1 |
| 4,245,431 | 1/1981 | Barbulescu | 47/1 A |

FOREIGN PATENT DOCUMENTS

| | | | |
|---|---|---|---|
| 218569 | 5/1957 | Australia | 111/34 |
| 224753 | 7/1985 | German Democratic Rep. | 221/211 |

Primary Examiner—James R. Feyrer
Attorney, Agent, or Firm—Learman & McCulloch

[57] ABSTRACT

A vacuum type seeding machine including a rotatably mounted cylindrical seeding drum, a vacuum manifold member and a supporting member for the cylindrical seeding drum rotatable relative to the manifold member for applying vacuum to the cylindrial seeding drum. The cylindrical drum includes ducts extending therealong from an end face communicating with said vacuum manifold member, the ducts communicating with a series of ports on the surface of the cylindrical seeding member to hold seeds thereagainst in a predetermined seeding pattern when vacuum is applied to the ducts.

8 Claims, 6 Drawing Figures

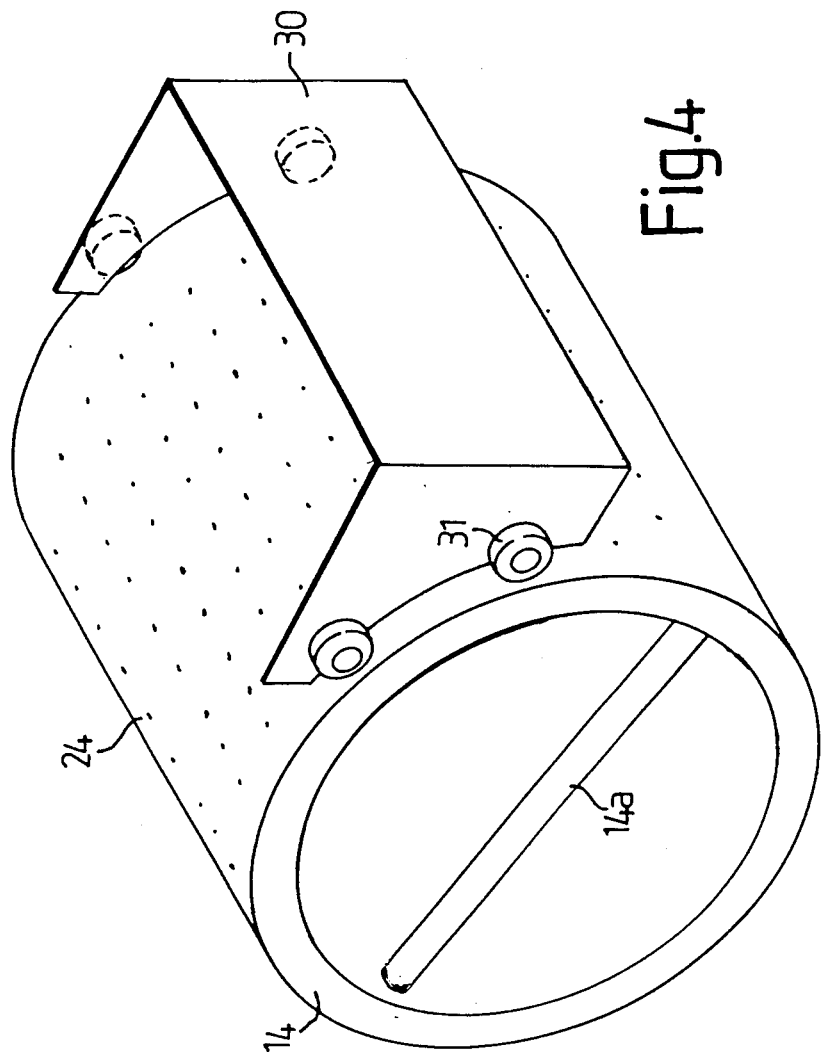

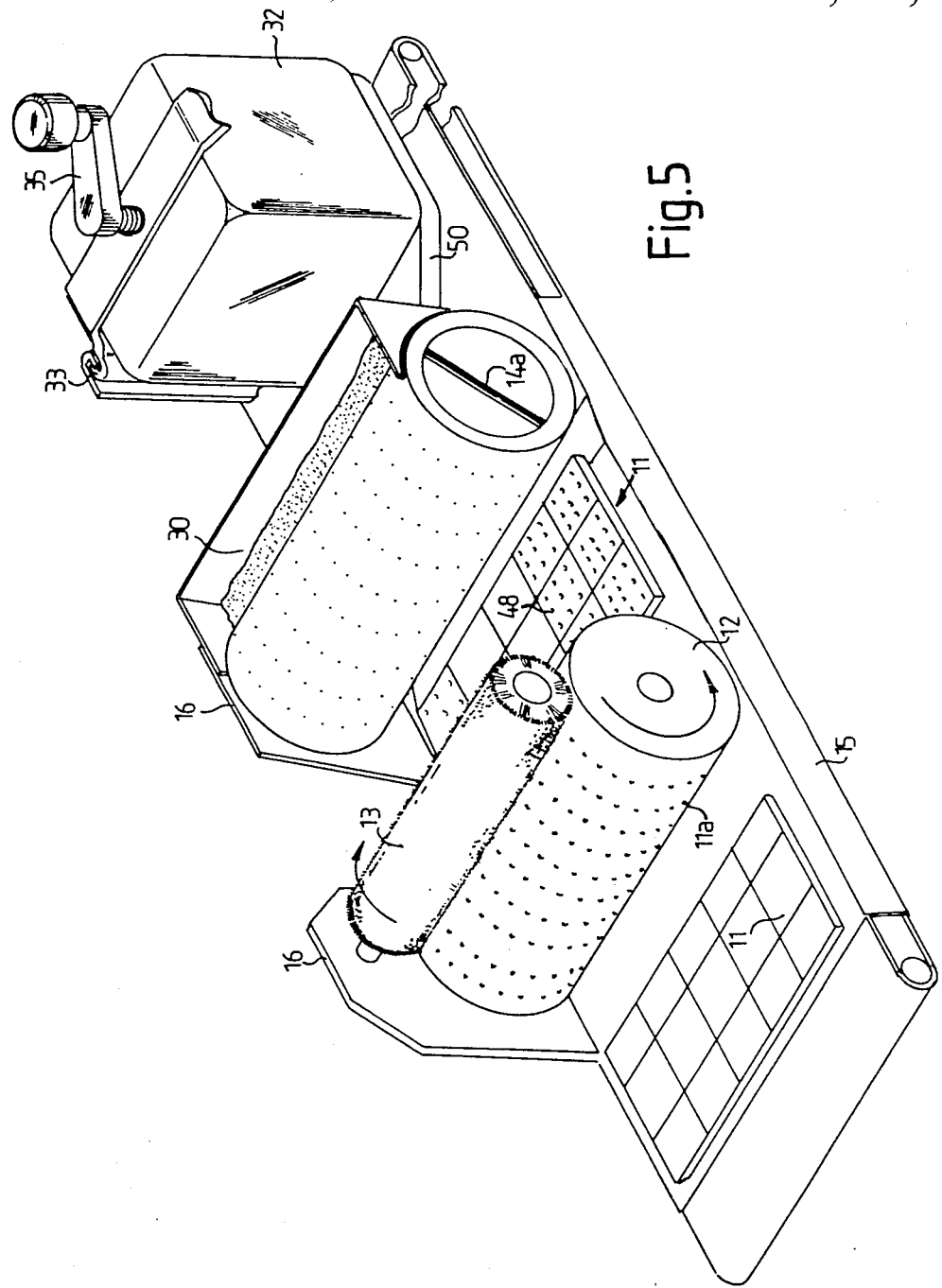

MULTI-PURPOSE SEEDING MACHINE

The present invention relates to vacuum type seeding machines and apparatus for planting seeds into seedling flats for propagation. Various seeding machines exist which place seeds on the surface of a tray of soil. Machines exist that will sow pre-germinated seed by using a nozzle dipped into an inverted pyramid type of container on an intermittant basis.

All seeders known to applicant are difficult to quickly modify to sow different diameter seeds and different seed patterns, in a seedling flat.

It is a principal objective of the present invention to provide a vacuum type seeding machine enabling large scale sowing of seeds of widely varying size and type with minimum disruption to the machine operation.

It is a more specific object of this invention to enable the sowing of both raw seed and pre-germinated seed with a machine providing a quick change from raw seed to pre-germinated seed and variations of seed size from lobelia 0.33 mm./diameter to sweet peas 5 mm./diameter. It is also an object of this invention to enable the very rapid sowing of seeds up to 800,000 per hour.

There is provided according to the present invention a vacuum type seeding machine comprising a rotatably mounted cylindrical drum member, a vacuum manifold member, and means supporting said cylindrical member for rotation relative to said manifold member for applying vacuum to said cylindrical member, said cylindrical member including ducts extending therealong opening from an end face, communicating with said vacuum, said ducts communicating with a plurality of ports on the surface of said cylindrical member adapted in use to hold seeds thereagainst in a predetermined seeding pattern when vacuum is applied to said ducts.

Conveniently the cylindrical member is retained on said support means only by the axial force exerted under the influence of said vacuum. Thus the cylindrical member can be removed simply by removing the vacuum and sliding the cylindrical member away and replacing it with one suitable for a different seed size and grade and seed spacing. The invention also provides a dibbling apparatus for forming a pattern of hole sizes to receive seeds from the seeding apparatus, the dibbling apparatus being constructed on a similar principle to the seeding apparatus in providing a cylindrical member rotatably supported relative to a vacuum manifold and means supporting said cylindrical member, said cylindrical member including dibbling means for forming seed planting holes in a seedling flat in a predetermined pattern.

Conveniently the seeding apparatus includes a seed hopper which is adapted to hold seeds in surface to surface contact with the cylindrical member over the apertured surface area thereof. The seed hopper maybe modified to hold a seed/water mire wherein pregerminated seeds are applied to the surface apertures of the cylindrical member when in use.

In a further aspect of the invention means are provided to ensure singulation of seed to each surface aperture and further means are provided to ensure removal of unwanted seeds adhering to the surface apertures.

The invention will be described in greater detail having reference to the accompanying drawings in which;

FIG. 1a is a sectional view taken on line A—A.

FIG. 4 is a perspective view of a dry seed handling apparatus.

FIG. 5 is a semi-schematic perspective view of a dibbling and seeding machine.

Figure 1:
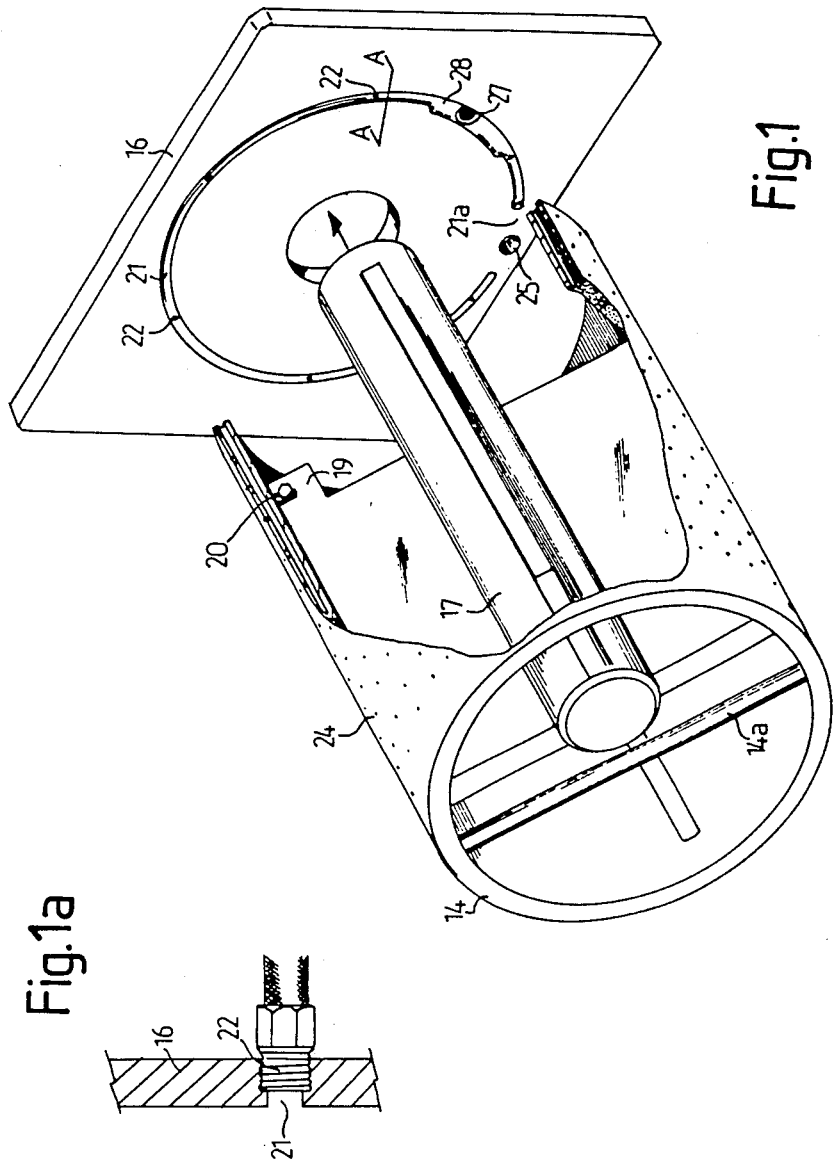
FIG. 1 is an exploded partial section perspective view of a seeder apparatus.

The seeding apparatus shown in FIG. 5 includes a conveyor feed for seedling flats or punnets 11. The apparatus includes a dibbler drum 12, cleaning brush 13 and a cylindrical seed drum 14 all rotatably mounted in spaced relationship along the conveyor 15. Optionally the apparatus may be used with pregerminated seed/water mixture as will be described in greater detail later. The rotary motion of the dibbling drum 12 and seeding drums allows continuous operation to provide smooth operation and efficient output levels.

The apparatus allows the interconnection of a line of nursery machinery such as seedling flat fillers, covering and watering machines, not normally carried out when using intermittent type seeding machinery.

A rotary dibbler 12 is used to roll over the seedling flats 11 containing a medium suitable for growing seedlings. The dibbler is timed and geared to maintain the same surface speed of the seeding drum 14 and the conveyor 15 and geared for the brush 13 to rotate at a higher surface speed against the dibbler drum 10. This enables the dibbler drum to be kept clean while the adhering soil (growing medium) is swept from the drums onto the next approaching flat of soil 11. This ensures that there is no build up of soil and that each flat (tray) of soil is rolled over leaving the imprint of the dibbler teeth 11a.

The tray is carried along the conveyor to have seeds deposited on it by the seeder drum 14. The seed drum and dibbler drum operation will now be described in greater detail.

Figure 3:
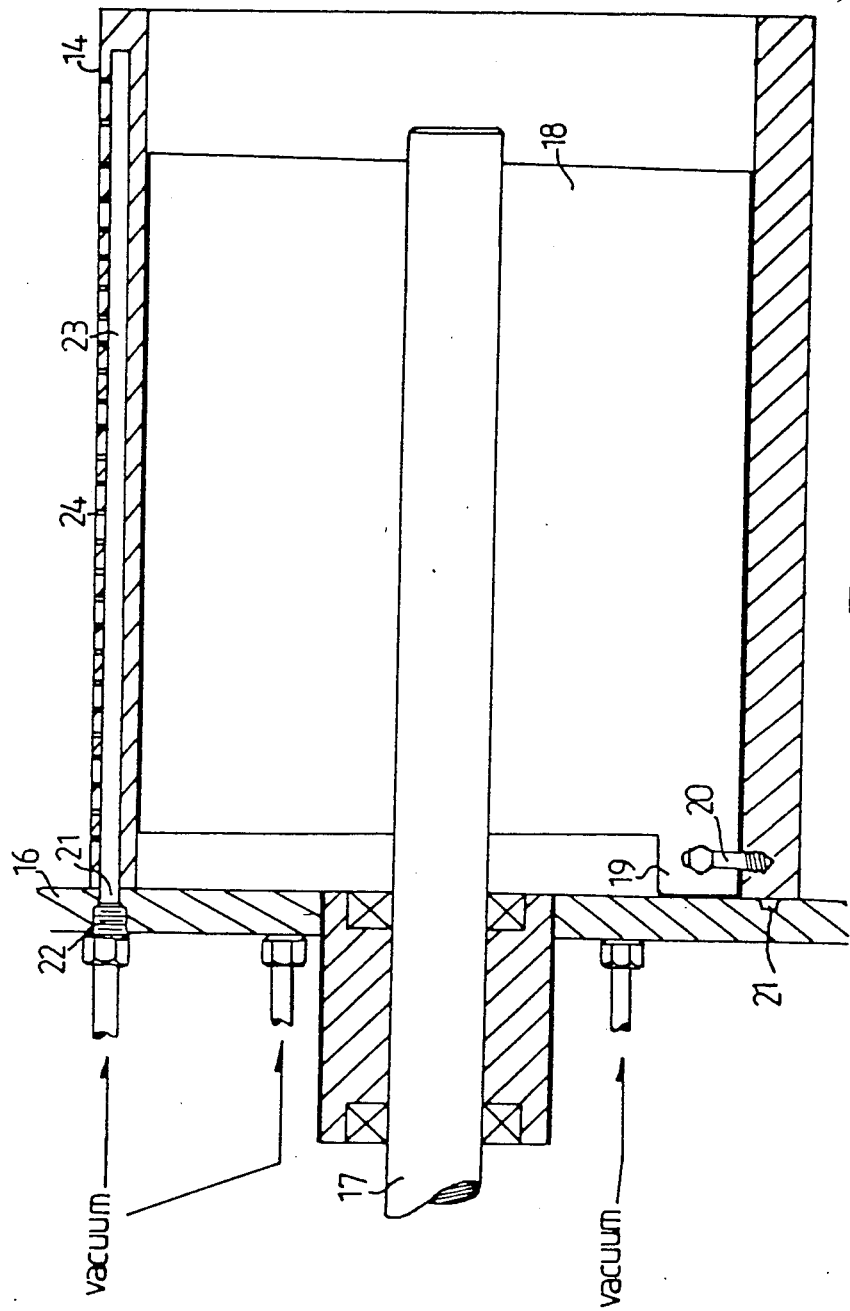
FIG. 3 is a sectional side view of the seeder apparatus.

With reference to FIGS. 1 and 1(a) and 3, the seeder drum is composed of four main parts, namely the drum 14, a manifold plate 16 and rotatable support member 17. The support member includes vanes 18 upon which the drum is slidably received. One vane includes a driving lug 19 interengaging with an adjustable lug 20 on the drum. The manifold plate 16 includes a circular recess 21 connected through a series of apertures 22 through to the back of the plate to a vacuum source of conventional type and not shown.

The supporting shaft 17 is supported on the plate 16 by bearings and is arranged to be driven by conventional drive means. The dibbler drum 12 is supported in exactly the same way on a rotatable shaft and retained by application of vacuum to a similar recess 21. Accordingly duplicate description of the dibbler drum is believed unnecessary.

The seeder drum 14 includes ducts 23 extending parallel to the drum axis along its length and equi-spaced around the circumference of its drum. The ducts are interconnected to a series of radially extending apertures 24 which open to the outer surface of the drum. Thus in operation when vacuum is applied to the drum the drum is maintained engaged against the surface of the plate 16 and furthermore air in the ducts 23 and radial apertures 24 is evacuated to retain seeds at each aperture 24.

Figure 2:
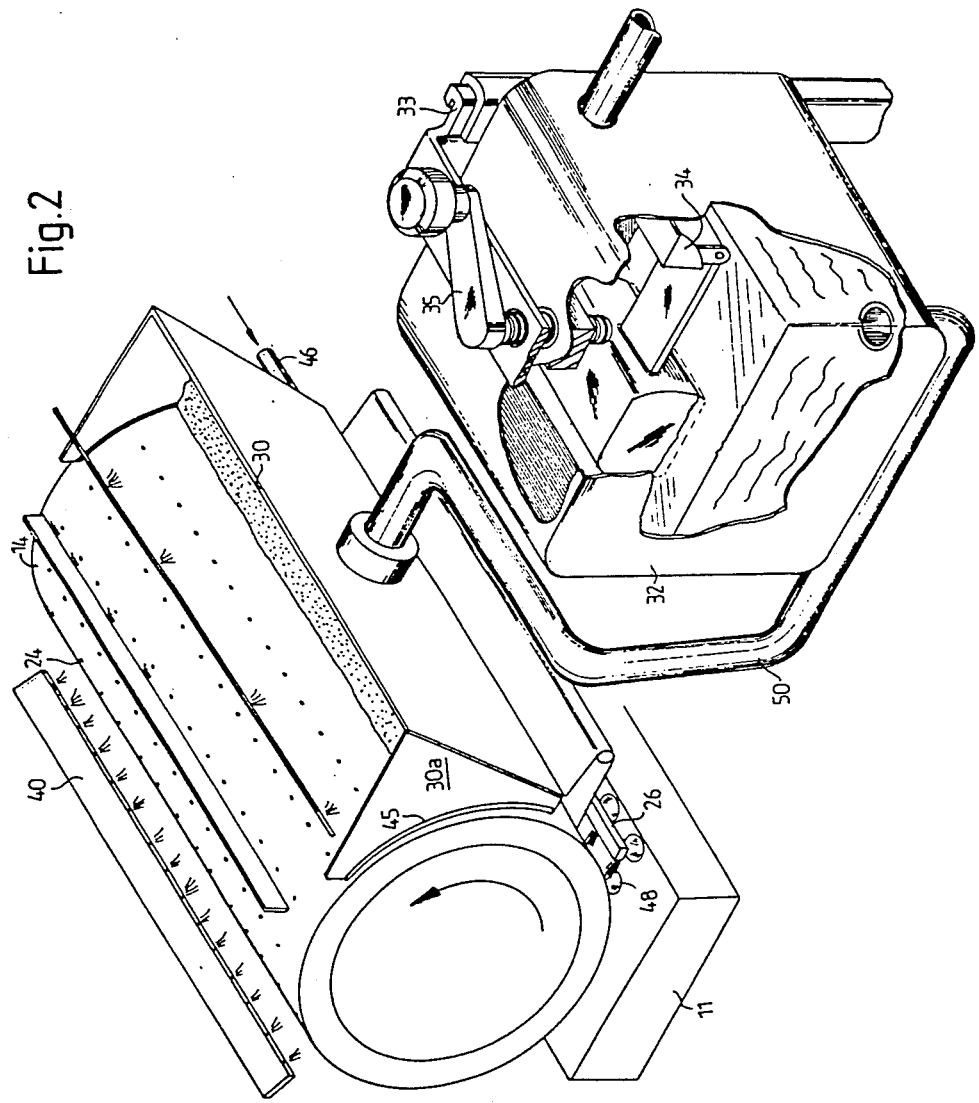
FIG. 2 is a perspective view of a pregerminated seed handling apparatus.

Referring to FIGS. 2 and 4, the seeds are housed in a hopper 30 closely spaced against the surface of the drum by rollers 31 such that seeds housed in the hopper are picked up under vacuum by each aperture 24, and carried over to coincide with a dibbled seedling flat, travelling beneath the drum on the conveyors. The circular recess 21 is blocked at 21a and includes a large port 25 which is simply open to atmosphere. Thus as the duct 23 with associated seeds on apertures 24 coincides with the port 25 at or near bottom dead centre of the drum movement the seed is allowed to fall under gravity onto the seed bed. Any retained seeds are scraped or blown off by air jet nozzle 26 shown in FIG. 2. In addition a high pressure jet of air may blow into the duct 23 and apertures 24 from port 27 which is surrounded by an enlarged vacuum recess 28 to ensure maintenance of sufficient suction force to counter the positive force created around port 27. Thus the seeder drum alternates under the influence of vacuum or relatively negative pressure and atmospheric a relatively positive pressure. Seeds that have not dropped from the effects of gravity are preferably removed by high pressure jets for cleaning purposes, these functions being carried out during a full 360° rotation of the drum.

A feature of the seed drum 14 is the shape and design of the inter-connecting ducts and the fact that it is held in place against the vacuum plate with its various galleries by vacuum alone, enabling very quick change over of drums for orifice size or pattern to suit the particular seeds being sown. This is very important to seedling growers as demand is for seedling growers to produce a diverse variety and quantity of plants but still requiring rapid throughput.

An additional feature of the invention is the ability of the machine to be switched over from raw seed sowing to pregerminated sowing.

This is achieved by providing sealing means 45 on the seed hopper 30. Seed that has been pregerminated is kept in suspension in the hopper 30 container. Water level is maintained by a water container 32 mounted on vertical slideable mounts 33, whereby a fixed level of water is maintained within the container by the float and valve 34, the tank being raised and lowered by adjustable screw thread and the seed hopper 30 to maintain a continual flow to replenish water drwn off through the drum vacuum holes. The water that is sucked in through the galleries while picking up seeds is separated in a cyclone separator (not shown), forming part of the vacuum pump.

A compressor (not shown) supplies air through regulators for high pressure air cleaning of the seed holes prior to the vacuum mode and also through seed singulator bars 40.

The singulator bars 40 have rows of tiny air holes which produce an air curtain for removing unwanted additional seeds other than those engaged on the orifice under vacuum.

The seeding drum 14 is a hollow tube which may be of a non rust plastic material impregnated with a molybdenum disulphide lubricant or the like, the material being anti static to prevent build up of static electricity and thus clinging of seeds. The wall of the drum is of sufficient thickness to allow the drilling of longitudinal ducts just below the surface of the drum. Various sized small apertures from 0.28 mm to 2.2 mm depending upon the size of seed to be handled for a particular drum are then drilled through the surface of the drum into the longitudal ducts.

The drum 14 is attached and held in contact with the vacuum plate 16 by vacuum only; no mechanical tension or mounting is required. This allows for attachment or removal in seconds, simply by turning off the vacuum pump to the valve plate 16 and by holding handle 14a removing the drum.

The drum 14 slides over the vanes 18 and the drum drive lug 20 engages on the driving lug. Upon sliding the drum on to the vanes 18 the drum engages against the vacuum plate 16 and when the vacuum is turned on the drum 16 is held firmly against the vacuum plate solely by the vacuum slot 21 in the valve plate. When the vanes are rotated by a driving means (not shown), the drum stays stationary until the lug 19 engages against the drum lug 20. This ensures the correct alignment and timing of surface apertures 24 with the pre formed holes 48 in the surface of the soil in the seedling flat.

The vacuum recess 21 is instrumental in holding the drum firmly against the drum face and must do so even in the area of the high pressure orifice 27 which is used for purging and cleaning the surface holes. This can run up to pressures of 120 PSI, so it is therefore necessary to bias this high pressure by enlarging an area of the vacuum slot in the region as shown in FIG. 1 at 28.

For use with pregerminated seed, that is, seed that has been soaked in water at the correct temperature until the seed has reached the point of radical emergence, the seeder is designed as shown in FIG. 2.

The seed hopper 30 is faced with a lipped seal 45 that allows the hopper to perfectly seal against the rotating drum 14 along the lower lip of the seed hopper 30, and at the vertical end faces 30a of the seed hopper 30. The pre-germinated seed is suspended in water in the seed hopper 30. The seed drum apertures 24 which are interconnected with the drum ducts 23 and the valve plate vacuum slots 21, draw water into the apertures 24, and the water level is maintained by a water tank 32 fitted with a float and cistern valve 34.

The action of the water flowing from the tank through the tube 50 into the seed hopper 30 assists in agitating the water seed mass, and the rotation of the seed drum causes the water through surface tension to drag up on the face of the drum and induce a rotating action into the water in the hopper 30. An additional series of small orifices 46 are spread across the base of the seed hopper, so that water, air, or a water air mix can be injected into the hopper to further assist the suspension of seeds depending on the type and size.

The raising and lowering of the water seed mix in the hopper has the following effect. The lower the level the steeper the slope of the seed drum surface becomes and prevents numerous seeds from being carried up over the drum. Thus the slope of the drum and the variable water surface level can be used to advantage to suit various sized and shaped seeds, and is quickly adjustable.

As the drum continues to rotate the duct 27 passes a position on the valve plate at bottom dead centre that is vented 25 to atmospheric pressure. When dry seeding the seeds fall due to their own weight 20 and if they remain attached they are mechanically removed by air jet 26.

A valve (not shown) may be provided, when using wet pre-germinated seed, to provide a water pressure through port 25 at bottom dead centre to forcibly eject the seed into the preprepared cavity 48 in the seed bed.

The claims defining the invention are as follows:

1. In a vacuum seed singulating machine of the type having a rotary, cylindrical drum and a seed reservoir adjacent said drum, said drum having at least one row of apertures for capturing seed by suction and releasing such seed when the suction is broken, the improvement comprising:

a static manifold member defining a negative pressure zone for communicating a vacuum to said drum and a second zone for communicating air of at least ambient pressure to said drum, the vacuum zone being more extensive than the second zone, said vacuum and second zones defining a circular shape which lies within the cross-sectional shape of said drum;

said drum having a series of ducts aligned to communicate the vacuum zone and the second zone with apertures in said row of apertures and to retain the drum against said manifold member;

means to center and rotate said drum relative to said manifold member; and means for providing a vacuum to said vacuum zone and at least ambient air pressure to said second zone, the vacuum being sufficient to retain said drum in engagement with said manifold member, whereby the drum will be retained on said manifold member by vacuum while the machine is operating and easily removed and replaced when the machine is not operating.

2. A machine according to claim 1 wherein said drum is retained on said manifold member solely by said vacuum.

3. A machine according to claim 1 including a cylindrical dibbing member having dibbing teeth on its peripheral surface, means rotatably mounting said dibbing member on said machine adjacent said drum, and means for rotating said dibbing member in timed relation to the rotation of said drum.

4. A machine according to claim 3 wherein said dibbing member is rotated at a speed to enable said dibbing teeth to form holes in a seedling flat and wherein said drum is rotated at a speed to enable seeds released by said drum to be accommodated in said holes.

5. A machine according to claim 1 wherein said drum is interchangeable with other drums similar to said drum except for the size and number of said apertures.

6. A machine according to claim 1 wherein said seed reservoir is operable to contain dry seeds.

7. A machine according to claim 1 wherein said seed reservoir is operable to contain wet seeds and including means forming a liquid seal between said drum and said reservoir.

8. A machine according to claim 1 including singulating means operable to remove excess seeds from said drum.

* * * * *